United States Patent
Powell, Jr.

(10) Patent No.: US 8,104,430 B1
(45) Date of Patent: Jan. 31, 2012

(54) CLIMBING RESISTANT POLE ASSEMBLY

(76) Inventor: Jerry W. Powell, Jr., Greer, SC (US)

( * ) Notice: Subject to any disclaimer, the term of this patent is extended or adjusted under 35 U.S.C. 154(b) by 199 days.

(21) Appl. No.: 12/687,248

(22) Filed: Jan. 14, 2010

Related U.S. Application Data

(60) Provisional application No. 61/148,548, filed on Jan. 30, 2009.

(51) Int. Cl.
*A01K 39/00* (2006.01)

(52) U.S. Cl. .................. 119/57.9; 119/52.3

(58) Field of Classification Search ............ 119/57.9, 119/59, 52.3, 63, 428, 429, 52.2, 57.8; D30/124; 52/101; 43/124, 108
See application file for complete search history.

(56) References Cited

U.S. PATENT DOCUMENTS

| | | | |
|---|---|---|---|
| 4,031,856 A | 6/1977 | Chester | |
| 4,523,546 A * | 6/1985 | Latham | 119/57.9 |
| 5,156,112 A * | 10/1992 | Brown | 119/57.9 |
| 5,285,748 A * | 2/1994 | Weldin | 119/57.9 |
| 5,355,835 A | 10/1994 | Freed | |
| 5,375,558 A | 12/1994 | Drakos | |
| 5,394,641 A | 3/1995 | Danca | |
| 5,690,056 A * | 11/1997 | Korb | 119/52.3 |
| 5,720,238 A * | 2/1998 | Drakos | 119/57.9 |
| 5,878,537 A | 3/1999 | Flischel | |
| 6,269,771 B1 * | 8/2001 | Cotter | 119/57.9 |
| 6,378,459 B1 * | 4/2002 | Potente | 119/57.9 |
| 6,532,894 B2 | 3/2003 | Johnson | |
| 6,640,746 B1 | 11/2003 | Lund | |
| 6,986,322 B2 * | 1/2006 | Lumpkin et al. | 119/52.3 |
| 7,574,976 B2 * | 8/2009 | Ellen et al. | 119/57.9 |

* cited by examiner

*Primary Examiner* — T. Nguyen
(74) *Attorney, Agent, or Firm* — Allen Dyer Doppelt Milbrath & Gilchrist

(57) ABSTRACT

A pole assembly includes a pole having a hollow interior and at least one longitudinally elongated slot formed through the pole communicating with the hollow interior. A sleeve is slidably disposed around the pole and has at least one arm extending through the slot. A pulley and a counterweight are disposed inside the pole. A cord extends over the pulley between the at least one arm and the counterweight within the hollow interior.

18 Claims, 2 Drawing Sheets

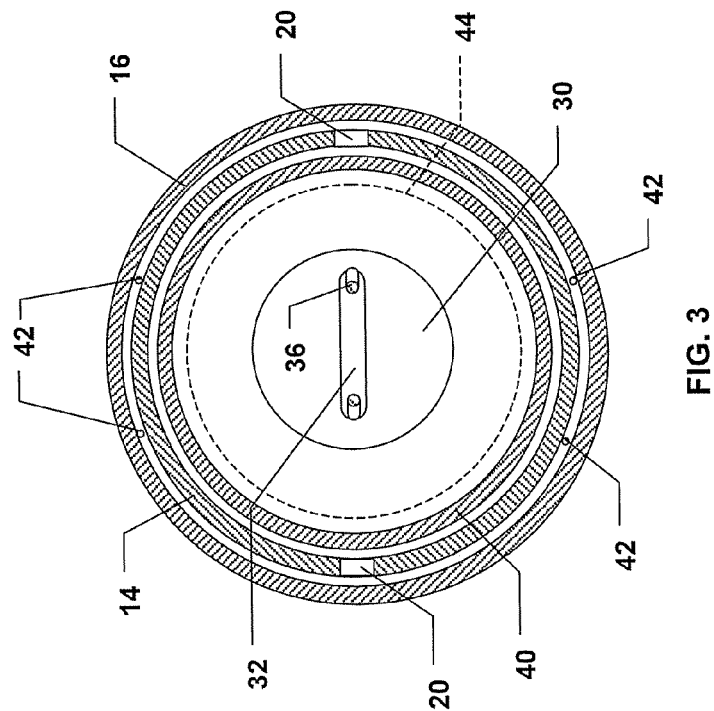
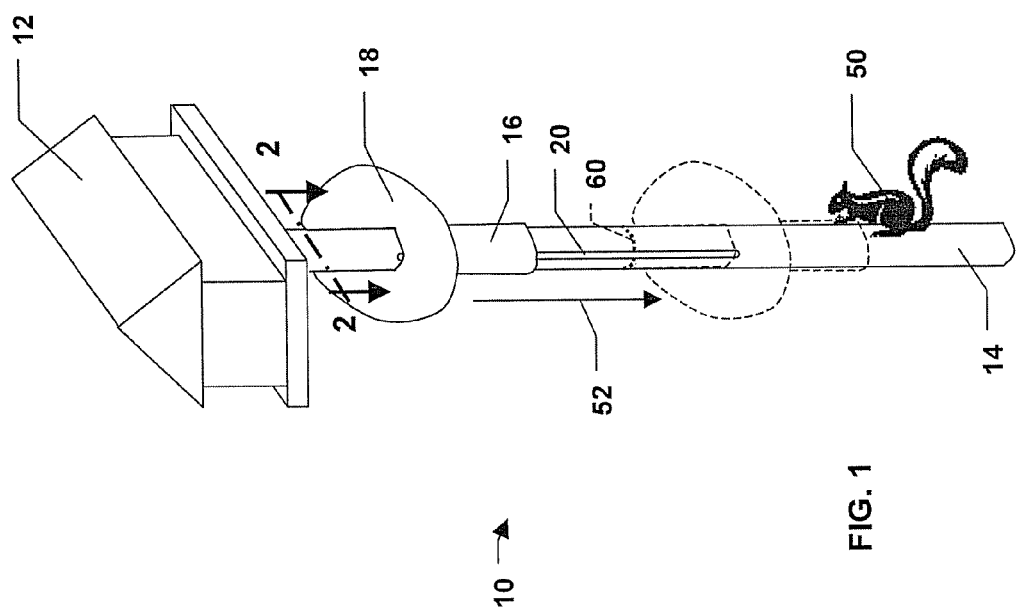

CLIMBING RESISTANT POLE ASSEMBLY

CROSS-REFERENCE TO RELATED APPLICATION

This application claims the benefit of U.S. Provisional Application Ser. No. 61/148,548, filed on Jan. 30, 2009, the contents of which are herein incorporated by reference in their entirety.

FIELD OF THE INVENTION

The present invention relates to poles designed to resist climbing, and more particularly, to squirrel resistant poles for bird feeders.

BACKGROUND OF THE INVENTION

Poles are commonly used for mounting bird feeders and birdhouses, as well as other animal feeders and habitats. A common nuisance associated with such uses is climbing of the pole and infiltration of the feeders or habitats by unwanted animals, such as squirrels. Various guards and mechanisms have been proposed over the years to deal with this nuisance.

An example of one such mechanism can be found in U.S. Pat. No. 4,031,856 (the '856 patent), the contents of which are hereby incorporated by reference in their entirety. A post according to the '856 patent includes an elongated sleeve slidably disposed thereabout. The sleeve is attached to a cord that traverses a pulley near the top of the pole and is connected to a counterweight insider the pole. When a squirrel reaches the sleeve while climbing the pole, the weight of the squirrel overcomes the counterweight. As a result the sleeve moves downward to prevent the squirrel from continuing up the pole.

While effective in principle, the pole of the '856 patent has some shortcomings. For instance, the counterweight acts asymmetrically on the sleeve, resulting in increased friction between the sleeve and pole. Additionally, the cord is exposed in a position where it may be grasped by a squirrel, as well as being more susceptible to decay due to environmental factors.

SUMMARY OF THE INVENTION

In view of the foregoing, it is an object of the present invention to provide an improved climbing-resistant pole assembly. According to an embodiment of the present invention, a pole assembly includes a pole having a hollow interior and at least one longitudinally elongated slot formed through the pole communicating with the hollow interior. A sleeve is slidably disposed around the pole and has at least one arm extending through the slot. A pulley and a counterweight are disposed inside the pole. A cord extends over the pulley between the at least one arm and the counterweight within the hollow interior.

These and other objects, aspects and advantages of the present invention will be better understood in view of the drawings and the following detailed description of a preferred embodiment.

BRIEF DESCRIPTION OF THE DRAWINGS

FIG. 1 is a perspective view of a pole assembly according to an embodiment of the present invention;

FIG. 3 is a sectional view taken along line 3-3 of FIG. 2.

DETAILED DESCRIPTION OF A PREFERRED EMBODIMENT

Figure 2:
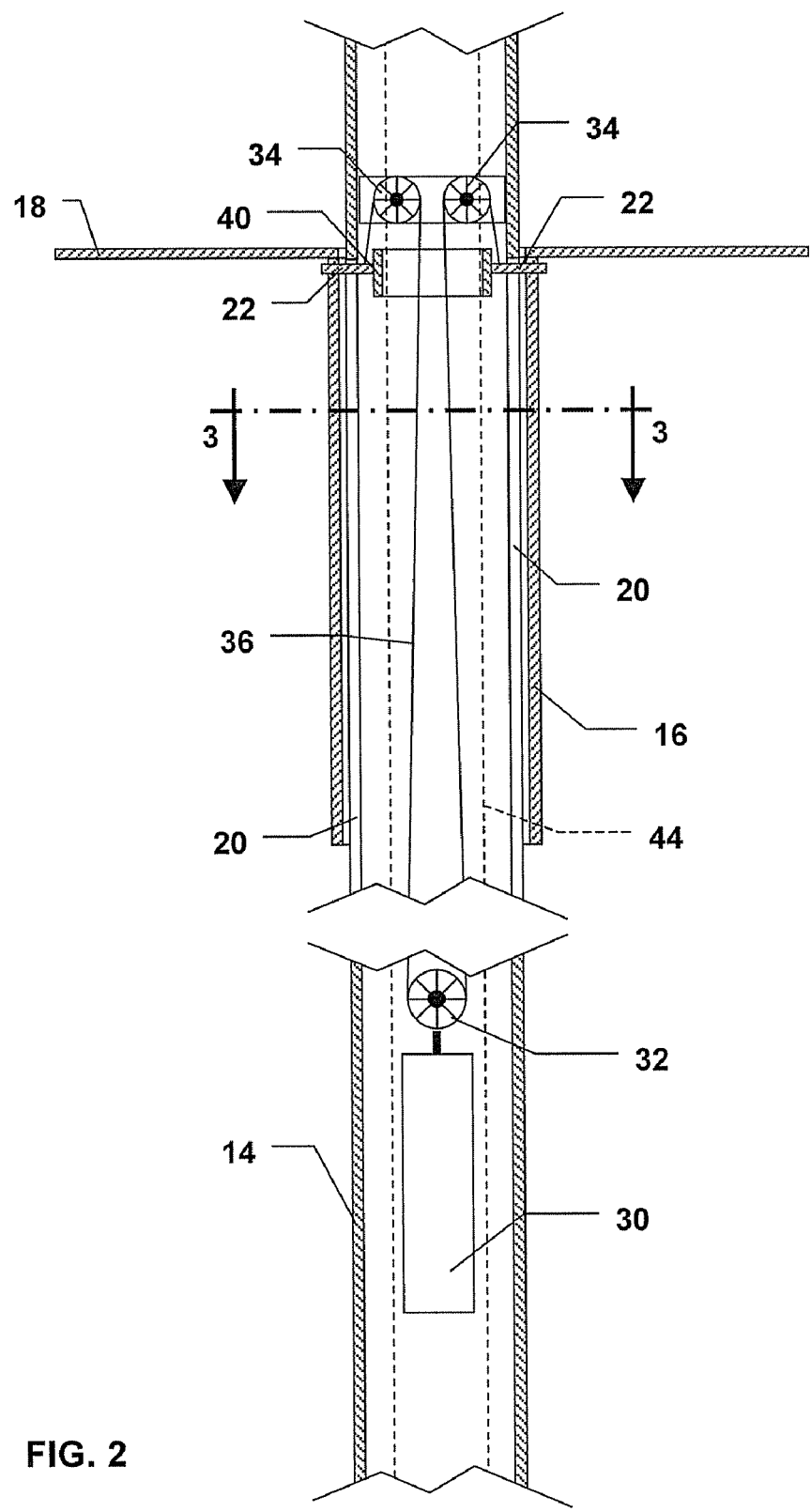
FIG. 2 is a partial sectional view taken along line 2-2 of FIG. 1.

Referring to FIG. 1, according to an embodiment of the present invention, a pole assembly 10 supports a bird feeder 12. The pole assembly includes a longitudinally extending pole 14 defining a substantially hollow interior. A longitudinally extending sleeve 16 is slidably disposed around the exterior of the pole 14. A guard 18 can extend outwardly from an upper edge of the sleeve 16. Longitudinally extending slots 20 are defined in the pole 14 in communication with the interior volume. Arms 22 connected to the sleeve 16 extend through the slots 20.

Referring to FIGS. 2 and 3, a counterweight 30 is connected to a counterweight pulley 32 suspended within the hollow interior of the pole 14. Sleeve pulleys 34 are arranged near an upper end of the pole 14. The counterweight pulley 32 is suspended from a cord 36 extending through the hollow interior of the pole 14 and over the sleeve pulleys 34. Opposite ends of the cord 36 are connected to the arms 22.

In the view of the foregoing, it will be appreciated that the pole assembly 10 advantageously maintains the cord 36 within the interior of the pole 14, safe from the elements and not at risk of being grasped by a squirrel or other pest. Additionally, forces from the counterweight 30 are symmetrically applied to the sleeve 16, resulting in smoother travel.

For additional stability and smoothness of travel, the arms 22 are connected with a ring 40 slidably disposed within the interior of the pole 14, and a plurality of ball bearings 42 are disposed between the sleeve 16 and the pole 14. Additionally, an interior pole 44 (shown in broken lines) can be located within the pole 14, preventing interference between the counterweight 30 and the ring 40 and arms 22 during movement of the sleeve 16.

Referring to FIGS. 1-3, in operation, a squirrel 50 or other pest attempts to climb the pole assembly 10. When the squirrel 50 reaches the sleeve 16, the weight of the squirrel 50 overcomes the counterweight 30 and the sleeve 16 slides downward in the direction of arrow 52. The downward motion of the sleeve 16 will cause the squirrel 50 to jump off the pole assembly 10, and the counterweight 30 will overcome the weight of the sleeve 16. As a result, the sleeve 16 will travel upward opposite the direction of the arrow 52. If the squirrel 50 somehow manages to climb up the sleeve 16 and scale the guard 18, the subsequent upward motion of the sleeve 16 will likely startle the squirrel 50 and dislodge it from the pole assembly 10.

The weight of the counterweight 30 should be selected based on the weight of squirrel or other pest for which the pole assembly 10 is intended to deter climbing, but should be heavy enough the overcome the weight of the sleeve 16 (including the guard 18, arms 22 and ring 40, as applicable). Also, the length of the slots 20 and cord 36 should allow sufficient range of motion to the sleeve to ensure dislodging of the squirrel or other pest.

The pole assembly 10 can be included in a kit including some or all of the various components thereof. To facilitate packing or shipping, the pole 14 can be divided longitudinally into two or more portions separate by one or more joints 60 (see FIG. 1), such as threaded joints. Advantageously, the joint(s) 60 can divide the slots 20 into sections that align at the joint(s), facilitating placement of the sleeve 16 and arms 22 around the pole 14 during assembly of the kit.

The foregoing description and drawings are provided for exemplary and illustrative purposes; the present invention is not necessarily limited thereto. Rather, those skilled in the art will appreciate that numerous modifications and adaptations for particular circumstances are possible with the scope of the invention as herein shown and described and of the appended claims.

What is claimed is:

1. A pole assembly comprising:
   a pole having a hollow interior and a first elongated slot formed through the pole communicating with the hollow interior;
   a sleeve slidably disposed around the pole;
   a first arm connected to the sleeve and extending through the first slot;
   a counterweight slidably disposed in the hollow interior;
   a first sleeve pulley rotatably mounted in the hollow interior; and
   a cord extending about the first sleeve pulley between the first arm and the counterweight within the hollow interior.

2. The assembly of claim 1, further comprising a ring slidably disposed within the hollow interior, the first arm being connected to the ring.

3. The assembly of claim 2, further comprising at least one bearing arranged between the pole and the ring and facilitating sliding motion therebetween.

4. The assembly of claim 1, further comprising a hollow inner pole extending within the hollow interior, the counterweight being disposed within the hollow inner pole.

5. The assembly of claim 1, further comprising a guard extending outwardly from the sleeve.

6. The assembly of claim 1, further comprising:
   a second arm connected to the sleeve; and
   a second sleeve pulley rotatably mounted within the hollow interior;
   wherein a second elongated slot is defined extending through the pole, the second arm extending therethrough, and the cord also extends about the second sleeve pulley and the counterweight within the hollow interior.

7. The assembly of claim 6, wherein the cord is continuous between the first first and second arms.

8. The assembly of claim 6, further comprising a counterweight pulley rotatably mounted to the counterweight, the cord also extending about the counterweight pulley.

9. The assembly of claim 6, wherein the first and second arms are substantially opposed.

10. A pole assembly comprising:
    a pole having a hollow interior and first and second elongated slots formed through the pole communicating with the hollow interior;
    a sleeve slidably disposed around the pole;
    first and second arms connected to the sleeve and extending through the first and second slots, respectively;
    a counterweight slidably disposed in the hollow interior;
    first and second sleeve pulleys rotatably mounted in the hollow interior; and
    a cord extending between the first arm, the counterweight and the second arm about the first sleeve pulley, and the second sleeve pulley within the hollow interior.

11. The assembly of claim 10, further comprising a ring slidably disposed within the hollow interior, the first and second arms being connected to the ring.

12. The assembly of claim 10, further comprising a counterweight pulley rotatably mounted to the counterweight, the cord extending about the counterweight pulley between the first and second sleeve pulleys.

13. The assembly of claim 10, further comprising a guard extending outwardly from the sleeve.

14. The assembly of claim 10, wherein the first and second arms are substantially opposed.

15. A pole assembly kit, the kit comprising:
    a pole having a hollow interior and a first elongated slot formed through the pole communicating with the hollow interior;
    a sleeve slidably disposable around the pole;
    a first arm connected to the sleeve such that the first arm is extendable through the first slot when the sleeve is disposed around the pole;
    a counterweight slidably disposable in the hollow interior;
    a first sleeve pulley rotatably mountable in the hollow interior; and
    a cord extendable about the first sleeve pulley between the first arm and the counterweight within the hollow interior.

16. The kit of claim 15, wherein the pole includes connectable upper and lower pole halves connectable at a joint.

17. The kit of claim 15, wherein the joint is threaded.

18. The kit of claim 15, wherein the first elongated slot includes upper and lower slot sections alignable at the joint.

* * * * *